United States Patent Office 3,103,522
Patented Sept. 10, 1963

3,103,522
NEW THERAPEUTICALLY USEFUL DERIVATIVES OF 4 - HYDROXY - 17 ALPHA-METHYL-TESTOSTERONE
Bruno Camerino, Roberto Sciaky, and Giovanni Sala, Milan, Italy, assignors to Societa Farmaceutici Italia, a corporation of Italy
No Drawing. Filed Jan. 3, 1961, Ser. No. 79,960
Claims priority, application Italy Jan. 4, 1960
8 Claims. (Cl. 260—397.4)

The invention relates to new therapeutically useful steroid compounds, that is to new derivatives of 4-hydroxy-17α-methyl-testeosterone having the general formula:

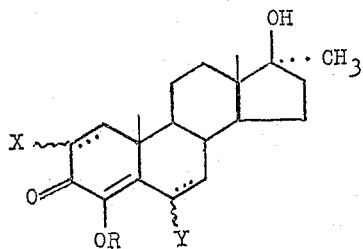

wherein
X=H, Br or is lacking when there is a 1,2 double bond,
Y=H when X=Br or is lacking, Cl when X=H or Br, or is lacking when there is a 6,7 double bond and when X=H or is lacking, and
R=H or Ac where
Ac=acyl group derived from an acid containing not more than 9 carbon atoms, and to processes of preparing them.

B. Camerino et al. have disclosed (in J. Am. Chem. Soc. 78, 1956, page 3540), a number of steroids of the androstane series (having either a chlorine or a hydroxy group in 4-position), which possess outstanding anabolic activity and low androgenic effect. Moreover, all of the products described in the publication are highly active when administered subcutaneously.

More recently, B. Camerino et al. have described (in British patent specification 848,288) 4-hydroxy-17α-methyl-testosterone, which has a high anabolic activity and low androgenic effect, even when administered orally. Orally active anabolic substances are especially sought after in the clinic.

The new products of the invention possess oral anabolic potency which is superior to that of 4-hydroxy-17α-methyl-testosterone and therefore represent further real progress in the search for orally administrable anabolic substances which serve either to stimulate proteic anabolism, to improve the general condition, or to increase body weight.

In particular, the invention provides the following new compounds:

2ξ-bromo-4-hydroxy-17α-methyl-testosterone,
2ξ-bromo-4-hydroxy-17α-methyl-testosterone-4-acetate,
1,2-dehydro-4-hydroxy-17α-methyl-testosterone,
1,2-dehydro-4-hydroxy-17α-methyl-testosterone-4-acetate,
6ξ-chloro-4-hydroxy-17α-methyl-testosterone,
6ξ-chloro-4-hydroxy-17α-methyl-testosterone-4-acetate,
6,7-dehydro-4-hydroxy-17α-methyl-testosterone,
6,7-dehydro-4-hydroxy-17α-methyl-testosterone-4-acetate,
1,2:6,7-dehydro-4-hydroxy-17α-methyl-testosterone,
1,2:6,7 - dehydro - 4 - hydroxy - 17α - methyl - testosterone-4-acetate, and
2ξ-bromo-6ξ-chloro-4-hydroxy-17α-methyl-testosterone.

It is understood that other 4-acyloxy products having the aforesaid general structural formula are included within the scope of the present invention. The 4-esters can be derived from aliphatic or cycloaliphatic or aromatic acids containing not more than 9 carbon atoms, such as, for example, formate, acetate, propionate, butyrate, valerate, succinate, heptanoate, cyclopentylpropionate, cyclohexaneacetate, hexahydrobenzoate, benzoate, phenylpropionate and analogues.

The products of the present invention are prepared from 4-hydroxy-(or 4-acyloxy - ) 17α - methyl-testosterones described by B. Camerino et al. in the British patent specification 848,288.

The synthesis of the products of the invention is carried out substantially in accordance with the following schematic illustration:

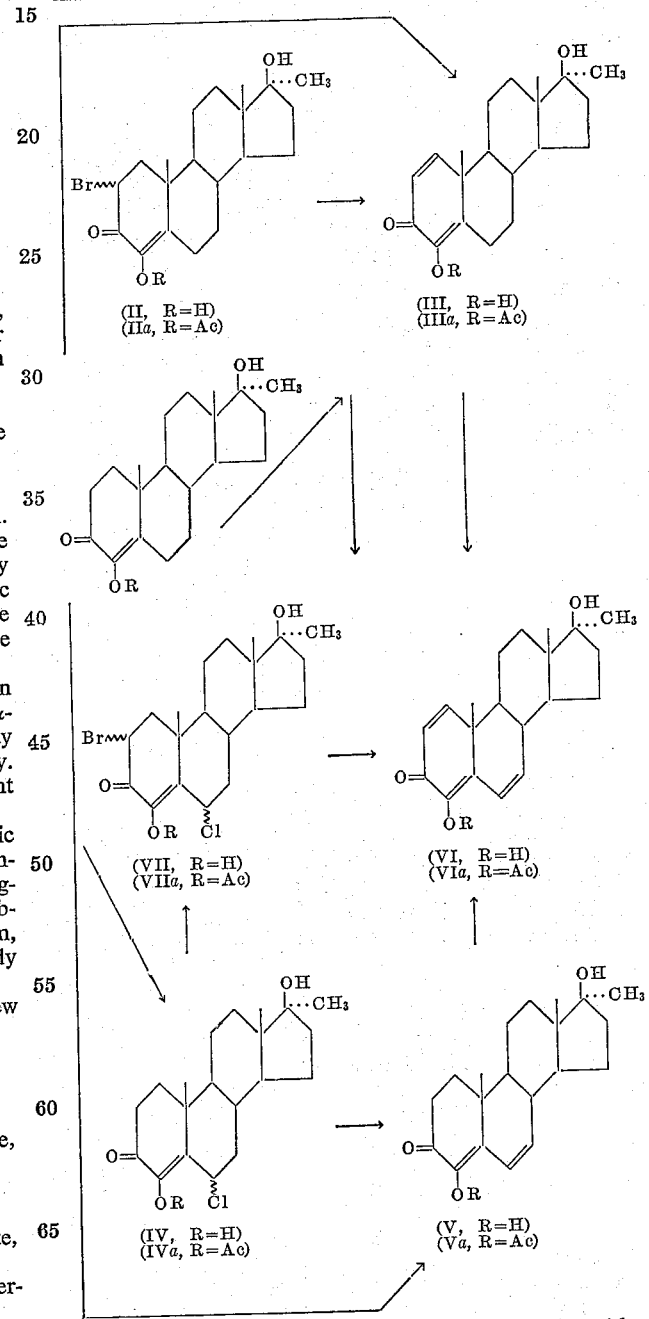

The process illustrated comprises halogenating 4-hydroxy-(or 4-acyloxy-)17α-methyl-testosterone (I and Ia), either with bromine in the 2-position to yield compound II or IIa, or with chlorine in 6-position to yield compound IV or IVa. This is followed by dehydrohalogenation to give products which contain respectively a double bond in the 1,2-position (III or IIIa) or in the 6,7-position (V or Va), or two double bonds in the 1,2- and 6,7-positions (VI or VIa). Products VI and VIa may alternatively be obtained from compound I or Ia by dehydrogenation in the 1,2- and 6,7-positions. Esterification of the 4-hydroxy group or hydrolysis of the 4-acyloxy group may be carried out between any steps in the synthesis.

A most surprising aspect of the process of the invention is that the halogenation with bromine occurs in the 2-position of the steroid nucleus, while the halogenation with chlorine occurs in the 6-position.

The formation of $\Delta^1$ and $\Delta^6$ derivatives of 4-hydroxy- (or 4-acyloxy-)17a-methyl-testosterones both by dehydrohalogenation of the corresponding 2-bromo- or 6-chloro-derivatives and by dehydrogenation in the 1,2- and 6,7-positions was quite unexpected in view of the presence of the hydroxy group in the 4-position, which may exist in a keto form, and in view of the hydroxy group in the 17-position whose elimination is known to occur very easily.

4-hydroxy-(or 4-acyloxy-)17a-methyl-testosterones (I or Ia) may be brominated in the 2-position either with bromine or with N-bromo-succinimide in an organic halogenated solvent such as carbon tetrachloride, chloroform or methylene dichloride or in acetic acid, to produce 2ξ-bromo-4-hydroxy-(or 4-acyloxy)17α-methyl-testosterones (II or IIa), or may be chlorinated in the 6-position either with chlorine or with N-chloro-succinimide in an organic halogenated solvent such as carbon tetrachloride, chloroform, or methylene dichloride or in acetic acid, to yield 6ξ - chloro-4-hydroxy-(or 4-acyloxy)17α - methyl-testosterones (IV or IVa).

Both by bromination in the 2-position of 6ξ-chloro-derivatives (IV and IVa) and by chlorination in the 6-position of 2ξ-bromo-derivatives (II and IIa), the 2ξ-bromo-6ξ-chloro-derivatives (VII and VIIa) may be obtained.

1,2 - dehydro-4-hydroxy-(or 4-acyloxy-)17α - methyl-testosterones (III or IIIa) may be obtained either from the 2-bromo-derivatives (II and IIa) by dehydrobromination with lithium bromide and lithium carbonate in dimethylformamide under a nitrogen atmosphere at about 80°–110° C. for 10–30 hours, or from the starting compounds I or Ia by dehydrogenation in the 1,2-position with selenium dioxide in t.butanol and optionally in the presence of acetic acid.

6,7-dehydro-4-hydroxy-(or 4 - acyloxy)17α - methyl-testosterones (V or Va) are prepared analogously either from the 6-chloro-derivatives (IV or IVa) by dehydrochlorination with lithium chloride and lithium carbonate in dimethylformamide or from the starting compounds I or Ia with chloranil in a warm aromatic solvent such as toluene.

1,2:6,7-dehydro-4-hydroxy-(or 4-acyloxy-)17α-methyl-testosterones (VI or VIa) are produced either from the corresponding 6,7-dehydro-derivatives (V or Va) by dehydrogenation in the 1,2-position with selenium dioxide, or from the corresponding 1,2-dehydro-derivatives (III or IIIa) by dehydrogenation in the 6,7-position with chloranil. The same products (VI and VIa) may be prepared from the corresponding 2ξ-bromo-6ξ-chloro-derivatives (VII or VIIa), by dehydrohalogenation with lithium chloride, lithium bromide and lithium carbonate in the presence of dimethylformamide.

The acylation in the 4-position of the new compounds of the present invention may be carried out with the chloride or the anhydride of an organic acid having not more than 9 carbon atoms optionally in the presence of tertiary amines such as pyridine, between any steps of the synthesis. The hydrolysis of the acyloxy group in the 4-position of the new compounds having the aforesaid general structural formula may be effected between any steps of the synthesis with alkali according to known procedures.

The compounds of the invention show unexpected anabolic activity and are particularly useful when orally administered. In comparison with the known 4-hydroxy-17α-methyl-testosterone and its esters, the compounds of the invention are more useful therapeutically, as shown in the following examples.

The invention includes therapeutic compositions comprising one or more compounds of the invention with a pharmaceutically acceptable carrier which may be either a solid or a liquid. The compositions may be prepared as elixirs, tablets, powders, pills, capsules or in other dosage forms which are particularly suitable for oral administration. Liquid diluents, such as water, are employed in a sterile condition for parenteral use. Solid diluents and/or excipients include starch, lactose, talc, stearic acid, magnesium stearate, pectins and others generally used for these purposes. The active compounds may be used without diluents or excipients by placing them in the usual capsules such as gelatin capsules or other containers. The percentage of active ingredient in the composition may be varied according to the particular therapeutical form. In general, the compositions of the invention should contain at least 1%, preferably 5–75% of active substance.

The invention is illustrated by the following preferred embodiments:

*Example 1*

2ξ-BROMO-4-HYDROXY-17α-METHYL-TESTOSTERONE (II) FROM (I)—PROCESS WITH BROMINE 3 g. of 4-hydroxy-17α-methyl-testosterone (I) are dissolved in 30 cc. of anhydrous chloroform; the solution is cooled to 10° C. and 1.44 g. of bromine, dissolved in 15 cc. of anhydrous chloroform, are added with stirring. A quick absorption of bromine is observed. The chloroform solution is washed with water, 5% aqueous sodium bicarbonate, then with water to neutrality, dried over anhydrous sodium sulphate and evaporated to dryness under vacuum at a temperature under 35° C. The residue is crystallized twice from aqueous methanol.

1.6 g. of (II), melting at 102–104° C. with decomposition are obtained.

$\lambda_{max.}^{Ethanol}$ at 286 m$\mu$ ($\epsilon = 10,750$)

*Example 2*

2ξ-BROMO-4-HYDROXY - 17α - METHYL-TESTOSTERONE (II) FROM (I)—PROCESS WITH N-BROMOSUCCINIMIDE 1.59 g. of 4-hydroxy-17α-methyl-testosterone (I) are reacted with 0.89 g. of N-bromosuccinimide in boiling 35 cc. CCl₄ for 30 minutes and under direct illumination. The mixture is cooled, filtered and the filtrate is evaporated to dryness under vacuum at a temperature below 35° C. The residue is crystallized from aqueous methanol. The product melts at 102–104° C., has an absorption maximum at 286 m$\mu$ and is identical with the product (II) obtained as described in Example 1.

*Example 3*

2ξ-BROMO-4-HYDROXY-17α-METHYL-TESTOSTERONE-4-ACETATE (IIa) Ac=COCH₃ FROM (II)

1 g. of product (II), dissolved in 8 g. of pyridine is acetylated in known manner with 1 g. of acetic anhydride at room temperature. The product (IIa) melting at 80° C. (recrystallized from ether/petroleum ether) is obtained.

$\lambda_{max.}^{Ethanol}$ at 251 m$\mu$ ($\epsilon = 14,000$)

*Example 4*

1,2-DEHYDRO-4-HYDROXY-17α-METHYL-TESTOSTERONE (III) FROM (II)

To 2 g. of 2ξ-bromo-4-hydroxy-17α-methyl-testosterone (II), dissolved in 30 cc. of dimethylformamide, 2 g. of lithium bromide and 1.33 g. of lithium carbonate are added under nitrogen with stirring. The mixture is allowed to react at 105° C. for 20 hours. The solution is cooled and poured into 200 cc. of water; the steriod is extracted with ethyl acetate, the extract is washed with water to neutrality, dried over anhydrous sodium sulphate and evaporated to dryness. The residue is crystallised from ether/petroleum ether. After 2 crystallizations 0.61 g. of (III) melting at 158–161° C. are obtained.

$\lambda_{max.}^{Ethanol}$ at 305 m$\mu$ ($\epsilon = 5,100$)

$\lambda_{max.}^{Ethanol}$ at 244 m$\mu$ ($\epsilon = 7,400$), $[\alpha]_D^{22} = +64 \pm 2°$ (c.=1% in chloroform)

Example 5

1,2-DEHYDRO-4-HYDROXY-17α-METHYL-TESTOSTERONE-4-ACETATE (IIIa) Ac=COCH$_3$ FROM (III)

100 mg. of 1,2-dehydro-4-hydroxy-17α-methyl-testosterone (III), dissolved in 0.7 cc. of pyridine, are reacted with 0.15 cc. of acetic anhydride at room temperature. After 18 hours the solution is diluted with water, the steroid is extracted with ethyl acetate, the organic extract is washed with aqueous 5% hydrochloric acid, then with water, with aqueous 5% sodium bicarbonate and finally with water to neutrality. The extract is dried over anhydrous sodium sulphate and evaporated to dryness under vacuum. The residue is recrystallized from ether/petroleum ether. The product (IIIa) melting at 130–132° C. is obtained.

$\lambda_{max.}^{Ethanol}$ at 246 m$\mu$ ($\epsilon = 11,300$)

Example 6

1,2-DEHYDRO-4-HYDROXY-17α-METHYL-TESTOSTERONE-4-ACETATE (IIIa) Ac=COCH$_3$ FROM (Ia) Ac=COCH$_3$ 1 g. of 4-hydroxy-17α-methyl-testosterone-4-acetate (Ia) are reacted with 0.33 g. of selenium dioxide and 0.2 cc. of acetic acid in 20 cc. of t.butanol, at 70° C. under nitrogen with stirring. After 8 hours 0.33 g. of selenium dioxide are added and the reaction is prolonged for another 16 hours. The mixture is evaporated to dryness under vacuum and the residue is treated with ethyl acetate. The solution is washed with aqueous 7% ammonium sulphide, aqueous 7% ammonium hydroxide, water, aqueous 5% hydrochloric acid and finally with water to neutrality. The solution is dried over anhydrous sodium sulphate and evaporated to dryness under vacuum. The residue is recrystallized from ether/petroleum ether. After several recrystallizations the product (IIIa) (Ac=COCH$_3$) melting at 130–132° C. and identical with that produced as described in Example 5, is obtained.

Example 7

6ξ-CHLORO-4-HYDROXY-17α-METHYL-TESTOSTERONE (IV) FROM (I)—PROCESS WITH CHLORINE

To a solution of 2 g. of 4-hydroxy-17α-methyl-testosterone (I) in 10 cc. of anhydrous chloroform, 0.45 g. of chlorine dissolved in 3.4 cc. of anhydrous chloroform are added. The chloroform solution is washed with water, aqueous 5% sodium bicarbonate and with water to neutrality, dried over anhydrous sodium sulphate and evaporated to dryness under vacuum at a temperature under 35° C. The residue is treated with ether, the product is filtered and crystallized from ether. 0.75 g. of (IV) melting at 156–159° C. are obtained.

$\lambda_{max.}^{Ethanol}$ at 282 m$\mu$ ($\epsilon = 11,300$), $[\alpha]_D^{22} = -7 \pm 2°$ (c.=1% in chloroform)

Example 8

6ξ-CHLORO-4-HYDROXY-17α-METHYL-TESTOSTERONE (IV) FROM (I)—PROCESS WITH N-CHLOROSUCCINIMIDE 1.59 g. of 4-hydroxy-17α-methyl-testosterone (I) are reacted with 0.67 g. of N-chlorosuccinimide in 35 cc. boiling chloroform for 30 minutes and under direct illumination. The mixture is cooled, filtered and the filtrate is evaporated to dryness at a temperature below 35° C. The residue is crystallized from ether, the product (IV), identical with that yielded as described in Example 7, is obtained.

Example 9

6ξ-CHLORO-4-HYDROXY-17α-METHYL-TESTOSTERONE-4-ACETATE (IVa) Ac=COCH$_3$ FROM (IV)

200 mg. of 6ξ-chloro-4-hydroxy-17α-methyl-testosterone (IV) are dissolved in 1 cc. of pyridine and reacted with 0.2 cc. of acetic anhydride at room temperature. After 18 hours the solution is diluted with water, the steroid is extracted with ethyl acetate, the extract is washed with aqueous 5% hydrochloric acid, water, aqueous 5% sodium bicarbonate and finally with water to neutrality. The extract is dried over anhydrous sodium sulphate and evaporated under vacuum at a temperature below 35° C. The residue is crystallized from ether. The product (IVa) (Ac=COCH$_3$) melting at 155–158° C. is obtained.

$\lambda_{max.}^{Ethanol}$ at 245 m$\mu$ ($\epsilon = 11,700$)

Example 10

6,7-DEHYDRO-4-HYDROXY-17α-METHYL-TESTOSTERONE (V) FROM (IV)

1.1 g. of 6ξ-chloro-4-hydroxy-17α-methyl-testosterone (IV) dissolved in 26 cc. of dimethylformamide are reacted with 1.70 g. of lithium chloride and 1.20 g. of lithium carbonate under nitrogen with stirring at 105° C. for 20 hours. The solution is cooled and poured into 200 cc. of water. The steroid is extracted with ethyl acetate, the extract is washed with water to neutrality, dried over anhydrous sodium sulphate, decolorized with active carbon and concentrated to small volume. The residual solution is filtered, treated with ether and the product is filtered, washed with ether and crystallized twice from ethyl acetate.

$\lambda_{max.}^{Ethanol}$ at 319 m$\mu$ ($\epsilon = 21,500$)

Example 11

6,7-DEHYDRO-4-HYDROXY-17α-METHYL-TESTOSTERONE (Va) Ac=COCH$_3$ FROM (V)

By acetylation of (V), dissolved in pyridine, with acetic anhydride, the 4-acetate (Va) (Ac=COCH$_3$), melting at 125–130° C. is obtained.

$\lambda_{max.}^{Ethanol}$ at 289 m$\mu$ ($\epsilon = 21,500$)

Example 12

6,7-DEHYDRO-4-HYDROXY-17α-METHYL-TESTOSTERONE-4-ACETATE (Va) Ac=COCH$_3$ FROM (Ia) Ac=COCH$_3$

The product Ia, dissolved in toluene, is reacted with chloranil in the presence of p.toluensulphonic acid, according to the process described by Dodson et al. in U.S. patent specification 2,891,079. After chromatography over Florisil (registered trademark) the compound (Va) (Ac=COCH$_3$) melting at 125–130° C. is obtained.

$\lambda_{max.}^{Ethanol}$ at 289 m$\mu$ ($\epsilon = 21,500$)

Example 13

1,2:6,7-DEHYDRO-4-HYDROXY-17α-METHYL-TESTOSTERONE-4-ACETATE (VIa) Ac=COCH$_3$ FROM (Va) Ac=COCH$_3$

By dehydrogenation, in known manner, of Va (Ac=COCH$_3$)

dissolved in t.butanol with selenium dioxide and acetic acid, as described in Example 6, the product (VIa) Ac=COCH$_3$ melting at 166–169° C. is obtained.

$\lambda_{max.}^{Ethanol}$ at 225 m$\mu$ ($\epsilon = 12,800$)

$\lambda_{max.}^{Ethanol}$ at 252 m$\mu$ ($\epsilon = 3,600$)

$\lambda_{max.}^{Ethanol}$ at 305 m$\mu$ ($\epsilon = 12,000$)

Example 14

1,2 : 6,7-DEHYDRO-4-HYDROXY-17α-METHYL-TESTOSTERONE (VI) FROM (VIa) Ac=COCH₃

A solution of 1 g. of 1,2:6,7-dehydro-4-hydroxy-17α-methyl-testosterone-4-acetate in 20 cc. of methanol is boiled for 1 hour in the presence of 1 g. of potassium bicarbonate in 5 cc. of water. The solution is cooled, neutralized with dilute acetic acid and poured into water. The steroid is extracted with ethyl acetate, the extract is washed with water to neutrality, dried over anhydrous sodium sulphate and evaporated to dryness. The residue is crystallized from ether. The product (VI) melting at 181–183° C. is obtained.

$\lambda_{max.}^{Ethanol}$ at 232 mμ ($\epsilon$ = 11,800)

$\lambda_{max.}^{Ethanol}$ at 348 mμ ($\epsilon$ = 8,400)

Example 15

2ξ-BROMO-6ξ-CHLORO-4-HYDROXY-17α-METHYL-TESTOSTERONE (VII) FROM (II)

1.20 g. of 2ξ-bromo-4-hydroxy-17α-methyl-testosterone dissolved in 7.5 cc. of anhydrous chloroform are reacted with 212 mg. of chlorine dissolved in 2.1 cc. of anhydrous chloroform at 5° C. with stirring. A quick absorption of chlorine is observed. The chloroform solution is washed with water, aqueous 5% sodium bicarbonate and finally with water to neutrality. The extract is dried over anhydrous sodium sulphate and evaporated to dryness under vacuum at a temperature under 35° C. The residue is crystallized twice from ether. The product (VII) melting at 175–185° C. with decomposition is obtained.

$\lambda_{max.}^{Ethanol}$ at 293 mμ ($\epsilon$ = 9,500)

Example 16

2ξ-BROMO-6ξ-CHLORO-4-HYDROXY-17α-METHYL-TESTOSTERONE (VII) FROM (IV)

2.07 g. of 6ξ-chloro-4-hydroxy-17α-methyl-testosterone dissolved in 15 cc. of anhydrous chloroform are reacted with 0.95 g. of bromine dissolved in 10 cc. of anhydrous chloroform at 5° C. with stirring. A quick absorption of bromine is observed. The chloroformic solution is washed with water, aqueous 5% sodium bicarbonate and finally with water to neutrality. The extract is dried over anhydrous sodium sulphate and evaporated to dryness under vacuum at a temperature under 35° C. The residue is treated with ether; the raw product (VII) melting at 155–165° C. with decomposition is obtained. By crystallization from ether the M.P. rises up to 173–182° C. with decomposition.

$\lambda_{max.}^{Ethanol}$ at 293 mμ ($\epsilon$ = 9,300)

Example 17

1,2 : 6,7-DEHYDRO-4-HYDROXY-17α-METHYL-TESTOSTERONE (VI) FROM (VIII)

2 g. of 2ξ-bromo-6ξ-chloro-4-hydroxy-17α-methyl-testosterone, dissolved in 30 cc. of anhydrous dimethylformamide are reacted with 2.25 g. of lithium chloride, 2.25 g. of lithium bromide and 3.2 g. of lithium carbonate at 105° C. for 20 hours in a nitrogen atmosphere and with stirring. The solution is cooled and poured into 200 cc. of water; the steroid is extracted with ethyl acetate and the extract is washed with water, dried over anhydrous sodium sulphate and evaporated to dryness. The residue is crystallized many times from ether, and decolorized with active carbon. The product (VI) melting at 180–183° C. is obtained.

$\lambda_{max.}^{Ethanol}$ at 232 mμ ($\epsilon$ = 11,800)

$\lambda_{max.}^{Ethanol}$ at 348 mμ ($\epsilon$ = 8,400)

Example 18

1,2 : 6,7-DEHYDRO-4-HYDROXY-17α-METHYL-TESTOSTERONE-4-ACETATE (VIa) Ac=COCH₃ FROM (VI)

150 mg. of 1,2:6,7-dehydro-4-hydroxy-17α-methyl-testosterone dissolved in 1 cc. of pyridine are acetylated with 0.2 cc. of acetic anhydride at room temperature. After 18 hours the solution is diluted with water and the steroid is extracted with ether. The organic extract is washed with aqueous 5% hydrochloric acid, water, aqueous 5% sodium bicarbonate and finally with water to neutrality, dried over anhydrous sodium sulphate and concentrated to small volume. The product (VIa) Ac=COCH₃ which after crystallization from ether melts at 166–169° C. is obtained.

$\lambda_{max.}^{Ethanol}$ at 225 mμ ($\epsilon$ = 12,800)

$\lambda_{max.}^{Ethanol}$ at 252 mμ ($\epsilon$ = 3,600)

$\lambda_{max.}^{Ethanol}$ at 305 mμ ($\epsilon$ = 12,000)

Example 19

2ξ-BROMO-4-HYDROXY-17α-METHYL TESTOSTERONE (II) FROM (I)—BROMINATION IN ACETIC ACID 0.63 g. of bromine dissolved in 7.15 cc. of anhydrous acetic acid, are added, at 5° C. and with stirring to a solution of 1.25 g. of 4-hydroxy-17α-methyl-testosterone (I) in 7 cc. of anhydrous acetic acid. The solution is poured into 70 cc. of water and the steroid is extracted wtih ether. The organic extract is washed with water, aqueous 5% sodium bicarbonate, water to neutrality, dried over anhydrous sodium sulphate and concentrated to small volume. The product (II), identical with that prepared as described in Examples 1 and 2, is obtained.

Example 20

2ξ-BROMO-4-HYDROXY-17α-METHYL-TESTOSTERONE (II) FROM (IIa) Ac=COCH₃

A mixture of 0.5 g. of 2ξ-bromo-4-hydroxy-17α-methyl-testosterone-4-acetate (IIa) Ac=COCH₃ dissolved in 15 cc. of methanol and 0.5 g. of potassium bicarbonate dissolved in 5 cc. of water, is allowed to react at room temperature for 18 hours. The solution is neutralized with acetic acid, poured into water, and the steroid is extracted with ether. The extract is washed with water to neutrality, dried over anhydrous sodium sulphate and evaporated to dryness at a low temperature. The residue is crystallized from ether. The product (II), identical with that obtained as described in Examples 1, 2, and 19, is obtained.

PHARMACOLOGICAL ACTIVITY

The anabolic and androgenic activities of a number of products of the present invention are hereinafter reported in comparison with those of 17α-methyl-testosterone and 4-hydroxy-17α-methyl-testosterone. The anabolic (myotropic) and androgenic properties have been determined in male castrated rats weighing 30–40 g., according to the method of Hershberg et al. (Proc. Soc. Exp. Biol. and Med. 83, 1953, page 175). The increase in weight of "levator ani" muscle has been considered as an expression of anabolic activity, while the increase in weight of "prostate" gland has been considered as an expression of androgenic activity. The reported data in the following Table 1 are referred to wet weights of the organs.

For comparing the anabolic and endrogenic activities of the tested steroids the following ratio was established:

$$\frac{\text{Experimental levator ani weight minus control levator ani weight}}{\text{Experimental prostate weight minus control prostate weight}} = \text{therapeutic index (T.I.)}$$

The steroids were administered orally.

*Table 1.—Anabolic and androgenic activities (oral administration)*

| Steroid | Doses (mg./day) | Levator ani, mg. | Prostate | T.I. |
|---|---|---|---|---|
| Castrated controls | | 8.6 | 9.3 | |
| 17α-methyl-testosterone | 1 | 13.4 | 33.7 | 0.18 |
| Do | 2 | 17.7 | 43.9 | 0.26 |
| Do | 4 | 25.5 | 73.7 | 0.26 |
| 4-hydroxy-17α-methyl-testosterone | 0.5 | 22.6 | 32.4 | 0.61 |
| Do | 1 | 22.8 | 30.7 | 0.66 |
| Do | 2 | 30.7 | 48.1 | 0.57 |
| 2ξ-bromo-4-hydroxy-17α-methyl-testosterone (II) | 0.5 | 19.2 | 22.0 | 0.83 |
| 1,2-dehydro-4-hydroxy-17α-methyl-testosterone (III) | 0.25 | 14.8 | 19.2 | 0.63 |
| Do | 0.5 | 24.7 | 21.3 | 1.34 |
| 6ξ-chloro-4-hydroxy-17α-methyl-testosterone (IV) | 0.25 | 19.5 | 19.9 | 1.02 |
| Do | 0.5 | 21.6 | 24.8 | 0.83 |
| Do | 1 | 25.3 | 34.0 | 0.68 |
| 6ξ-chloro-4-hydroxy-17α-methyl-testosterone-4-acetate (IVa) Ac=COCH³ | 0.5 | 17.6 | 21.8 | 0.72 |
| | 1 | 21.9 | 26.4 | 0.77 |

The data of Table 1 show that the new products of the present invention, orally administered, possess a high myotropic activity, much higher than that of 17α-methyl-testosterone, about equal to that of 4-hydroxy-17α-methyl-testosterone, while their androgenic activity is much lower than those of the same comparison products.

Therefore the therapeutic index (T.I.) of the new products of the present invention is decidedly superior to that of 17α-methyl-testosterone and better than that of 4-hydroxy-17α-methyl-testosterone.

The relative anabolic potencies, determined at two dosage levels are reported in Table 2, with respect to our compounds II, III, IV, and IVa.

*Table 2.—Relative anabolic potencies*

| Steroid | Anabolic relative potency |
|---|---|
| 17α-methyl-testosterone | 1 |
| 4-hydroxy-17α-methyl-testosterone | 3 |
| Compound II | 4.6 |
| Compound III | 8 |
| Compound IV | 5.7 |
| Compound IVa (Ac=COCH₃) | 4 |

The meaning of the undulated linkage of X and Y in 2- and 6-positions of the general formula (Greek script letter ξ (xi)) is that said linkage is indeterminate.

We claim:

1. A derivative of 4-hydroxy-17α-methyl-testosterone, taken from the group consisting of those having one of the following formulae:

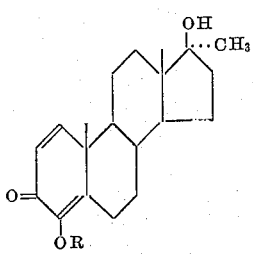

and

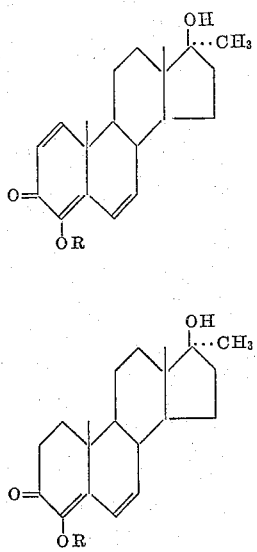

in which R is taken from the group consisting of H and Ac, the Ac radical being an acyl radical of the formula $R_xCO$ in which $R_x$ is a hydrocarbon radical having not more than nine carbon atoms.

2. A compound having the formula:

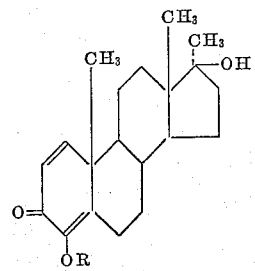

wherein R is a member selected from the group consisting of hydrogen and lower alkanoyl.

3. 1,2-dehydro-4-hydroxy-17α-methyl-testosterone.
4. 1,2 - dehydro-4-hydroxy-17α-methyl-testosterone-4-acetate.
5. 6,7-dehydro-4-hydroxy-17α-methyl-testosterone.
6. 6,7 - dehydro-4-hydroxy-17α-methyl-testosterone-4-acetate.
7. 1,2:6,7-dehydro-4-hydroxy-17α-methyl-testosterone.
8. 1,2:6,7 - dehydro - 4-hydroxy-17α-methyl-testosterone-4-acetate.

References Cited in the file of this patent

UNITED STATES PATENTS

| | | |
|---|---|---|
| 2,705,237 | Djerassi et al. | Mar. 29, 1955 |
| 2,762,818 | Levy et al. | Sept. 11, 1956 |
| 2,837,464 | Nobile | June 3, 1958 |
| 2,882,282 | Agnello et al. | Aug. 14, 1959 |
| 2,923,721 | Joly et al. | Feb. 2, 1960 |

OTHER REFERENCES

Ringold et al.: J. Org. Chem. 21, 239 (1956).